United States Patent
Spratte et al.

(10) Patent No.: US 10,192,666 B2
(45) Date of Patent: Jan. 29, 2019

(54) MAGNETIC DEVICE FOR LOCKING A GEAR SELECTOR LEVER OF A VEHICLE IN A PREDETERMINED POSITION, METHOD FOR PRODUCING A MAGNETIC DEVICE, AND METHOD FOR OPERATING A MAGNETIC DEVICE

(71) Applicant: ZF Friedrichshafen AG, Friedrichshafen (DE)

(72) Inventors: Joachim Spratte, Osnabrueck (DE); Thorsten Sander, Rahden (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 383 days.

(21) Appl. No.: 14/914,133

(22) PCT Filed: Jul. 28, 2014

(86) PCT No.: PCT/EP2014/066126
§ 371 (c)(1),
(2) Date: Feb. 24, 2016

(87) PCT Pub. No.: WO2015/028219
PCT Pub. Date: Mar. 5, 2015

(65) Prior Publication Data
US 2016/0217897 A1    Jul. 28, 2016

(30) Foreign Application Priority Data
Aug. 27, 2013   (DE) .................. 10 2013 217 048

(51) Int. Cl.
*F16H 59/10*     (2006.01)
*H01F 7/16*      (2006.01)
(Continued)

(52) U.S. Cl.
CPC ........... *H01F 7/1607* (2013.01); *F16H 59/10* (2013.01); *F16H 61/22* (2013.01); *H01F 7/1844* (2013.01);
(Continued)

(58) Field of Classification Search
CPC ...... H01F 7/1607; H01F 7/1844; F16H 59/10; F16H 61/22; F16H 2061/223
See application file for complete search history.

(56) References Cited

U.S. PATENT DOCUMENTS 6,487,883 B2 * 12/2002 Suzuki ............ B60R 25/02144
                                              477/99
6,662,924 B2 * 12/2003 Giefer ................ F16H 59/10
                                              192/220.7

(Continued)

FOREIGN PATENT DOCUMENTS

DE    10 2007 05882 A1    6/2009
DE    10 2009 04277 A1    4/2011
(Continued)

OTHER PUBLICATIONS

International Search Report dated Jan. 27, 2015 in International Application No. PCT/EP2014/066126, 5 pages.
(Continued)

*Primary Examiner* — David M Fenstermacher
(74) *Attorney, Agent, or Firm* — Brinks Gilson & Lione (57) ABSTRACT

A magnetic device for locking a gear shift lever of a vehicle in a predetermined position, where the magnetic device has a coil, a tie component, which is or can be movably supported in the coil, and a spring, which is disposed outside the coil, where the spring is designed to push the tie component out of the coil.

19 Claims, 8 Drawing Sheets

(51) Int. Cl.
  *H01F 7/18* (2006.01)
  *F16H 61/22* (2006.01)
  *H01F 41/02* (2006.01)

(52) U.S. Cl.
  CPC ....... *H01F 41/02* (2013.01); *F16H 2061/223* (2013.01)

(56) References Cited

U.S. PATENT DOCUMENTS

| | | | | |
|---|---|---|---|---|
| 8,020,675 B2* | 9/2011 | Cao | ................... | B60T 13/741 |
| | | | | 188/157 |
| 8,763,764 B2* | 7/2014 | Jang | ................... | B60T 17/221 |
| | | | | 188/300 |
| 8,844,703 B2* | 9/2014 | Jang | ................... | B60T 1/005 |
| | | | | 192/219.5 |
| 9,140,355 B2* | 9/2015 | Kim | ................... | F16H 61/22 |
| 9,383,012 B2* | 7/2016 | Popp | ................... | F16H 63/34 |
| 9,384,882 B2* | 7/2016 | Meun | ................... | H01F 7/088 |
| 9,644,694 B2* | 5/2017 | Smeeton | ................... | B60R 25/09 |
| 9,897,206 B2* | 2/2018 | Schuller | ................... | F16H 63/3433 |
| 2010/0156582 A1 | 6/2010 | Zelmer et al. | | |
| 2012/0090951 A1 | 4/2012 | Scherer et al. | | |

FOREIGN PATENT DOCUMENTS

| | | |
|---|---|---|
| DE | 10 2010 03958 A1 | 2/2012 |
| EP | 0576813 A1 | 1/1994 |

OTHER PUBLICATIONS

International Search Report and Written Opinion dated Jan. 27, 2015 in International Application No. PCT/EP2014/066126, 18 pages, German Language.

Search Report dated Apr. 22, 2015 in German Application No. DE 10 2013 217 048.3, 10 pages, German Language, including English Translation of p. 8.

* cited by examiner

MAGNETIC DEVICE FOR LOCKING A GEAR SELECTOR LEVER OF A VEHICLE IN A PREDETERMINED POSITION, METHOD FOR PRODUCING A MAGNETIC DEVICE, AND METHOD FOR OPERATING A MAGNETIC DEVICE

This application is a filing under 35 U.S.C. § 371 of International Patent Application PCT/EP2014/066126, filed Jul. 28, 2014, and claims the priority of DE 10 2013 217 048.3, filed Aug. 27, 2013. These applications are incorporated by reference herein in their entirety.

The present disclosure relates to a magnetic device for locking a gear selector lever of a vehicle in a predetermined position, to a method for producing a magnetic device, and a method for operating a magnetic device, according to the main Claims.

Magnetic devices such as shift-lock magnets for transmission gearshifts, for example, are designed currently as solenoid magnets in the conventional construction. Normally, a shift-lock magnet of this type has four elementary functions:

currentless locking into the selection position "P"
powered unlocking from selection position "P"
powered locking into the selection position "N"
currentless unlocking in the selection position "N"

Actuation and misuse forces should be supported in these positions via the tappet (also referred to as a tie). Furthermore, the magnet should function nearly silently. The stroke of the magnet is normally approximately 6.5 mm. The magnet (also referred to as the magnetic device) is normally configured for a 100% power-on time, and is operated while on. The challenge to current designs is to remain silent over the very long actuating stroke travel, and to nevertheless support the supporting forces.

The currently conventional design for such magnetic devices solves this problem in that a solid metal cage is used as the magnet yoke, into which bronze bushings are inserted, in order to minimize the friction and the actuation sounds. In order to absorb the end position sounds, "damper cushions" are installed on the tie. Magnetically, the magnet is designed such that there is a very high pulling force at the start, and the magnet "diminishes to nothing" in the end position. This means that a magnetic circuit becomes disengaged toward the end. The return and the locking into the shifting position "P" occur via a return spring. A tappet made of stainless steel is installed in the interior diameter of the tie, which reaches into the locking bushings of the counter-piece.

A coil is to be released in the vehicle when in the selection position "P," which allows the ignition key to be extracted. This is normally triggered with a micro-switch, which is disengaged by a locking element in the position "P."

A construction of a magnetic device such as this has proven, however, to be disadvantageous in some aspects. In particular it should be noted that, with respect to electro-magnets (also referred to as E-magnets), although the solid design of the magnet yoke enables the support of the misuse forces and the discharging of the resulting heat; it requires, however, a great deal of tooling and installation work. On one hand, the diminishing of the magnetic flux in the end position results in very high tolerances for the end position. But it also requires a continuous power supply in the end position with the actuating current. This, in turn, leads to an excessive self-heating of the magnets, leading to a very excessive heating of the shift lever, and causes a displacement of the heat specifications to as much as 125° C. The integration of an end position damping in the magnetic circuit results in an enlargement of the tie diameter. Furthermore, as a result thereof, the design freedom for the magnetic circuit is limited. The larger diameter of the tie also increases the mass of the tie. As a result, the kinetic energy required to move the tie is also increased, which energy must be braked in the end position. This increases the difficulties and the tolerances in the end position damping. The objectives described above for the E-magnets require a very large copper coil. The price of copper has increased significantly in recent years, as well as in this year. This has a visible effect on the cost of magnets. With respect to a micro-switch, it should be noted that the detection of the position "P" is carried out indirectly on the locking element. As a result of the local spacing of the magnets to the printed circuit board with a control electronics in some applications, a separate cable harness is required for each magnet and micro-switch. The micro-switch is normally a clearly distinct item in the "bill of material" (parts list).

Against this background, the present disclosure provides an improved magnetic device, an improved method for producing a magnetic device, and an improved method for operating a magnetic device in accordance with the independent claims. Advantageous designs can be derived from the dependent claims and the following description.

The present disclosure provides a magnetic device for locking a gear shift lever of a vehicle in a predetermined position, wherein the magnetic device has the following features:

a coil;
a tie component, which is or can be moveably supported in the coil; and
a spring, which is disposed outside the coil, wherein the spring is designed to push at least a portion of the tie component out of the coil.

A coil can be understood to be a packet having a metal wire wound around it, with an opening into which a moveable tie component can be inserted. A coil thus depicts an electromagnet when subjected to a current. A tie component can be understood to be a rod-shaped component, having at least one portion that comprises a metallic, magnetic or magnetizable core, that can be inserted into the coil, or into an opening in the coil, respectively. The tie component can also be comprised of numerous subcomponents. A spring can be understood to be a resiliently deformable component, with reacts to an activation force with an activation deformation, and when the activation force is removed, returns to its original position.

The present disclosure is based on the knowledge that by disposing the spring outside the coil, it becomes possible to obtain a very compact construction of the coil, and accordingly, to ensure that there is sufficient return capability for the tie component. As a result, there is the advantage that the coil can be produced with limited material expenditure, by means of which, on one hand, the production costs as well as the resulting weight can be kept low, and on the other hand, the installation space required for the magnetic device can also be kept small.

According to a specific embodiment of the present disclosure, the spring can be a conical or circular spring, wherein the spring encompasses, at least in part, the tie component. A design of this type for the present disclosure offers the advantage of a very uniform exertion of force by the spring on the tie component, such that a twisting of the tie component during a movement is substantially prevented.

In order to obtain a particularly light magnetic device, having as few metallic, and thus heavy, components as possible, the tie component can, according to one embodiment of the present disclosure, comprise a metallic, magnetic and/or magnetizable core that can move at least in part in the coil, and a tappet fastened to the core, having a different material than that of the core, in particular being made of a plastic material.

A higher wear or damage during operation of the magnetic device can be reduced or prevented thereby, when an end of the spring facing away from the coil is braced against a projection on the tie component, in accordance with one embodiment of the present disclosure, wherein a damping component is disposed between the projection and the coil. As a result, the material load to the tie component is reduced during operation of the magnetic device, and thus, the lifetime of the magnetic device is advantageously increased.

According to another embodiment of the present disclosure, a pad may be provided, wherein the pad is disposed on a side of the spring lying opposite the coil. An embodiment of the present disclosure of this type offers the advantage that even when the tie component is being pushed back by the spring, hard impacts can be avoided. As a result, the material load to the tie components during operation of the magnetic device is reduced, and thus the lifetime of the magnetic device is advantageously lengthened.

An embodiment of the present disclosure in which the damping component has an opening with an internal diameter corresponding to an external diameter of the pad, or wherein the pad has an opening with an internal diameter that corresponds to an external diameter of the damping component, is also advantageous. An embodiment of the present disclosure of this type offers the advantage of particular high savings in terms of material consumption, because, when producing the damping component and the pad, one of the two components can be produced from a waste product from the production of the other component.

A particularly precise positioning of the tie component can then be achieved when drawing the tie component into the coil if a stop component is provided, which is disposed on a side of the coil lying opposite the spring, wherein the stop component is designed to delimit a movement path of the tie component through the coil. In this case, it can be ensured that the tie component assumes the position of the tie element in the coil precisely defined by the stop component, even when the coil is activated with a reduced coil current. This leads, in turn, to a reduction in the current flowing through the coil that is needed for the activation, such that a reduction in the thermal load to the magnetic device is achieved during operation of the magnetic device. Lastly, a "peek and hold" function of the magnetic device can be implemented by means of such an embodiment of the present disclosure.

A particularly large bearing surface, and thus a particularly secure seating of the tie component in a desired position in the coil can be obtained in that, according to an advantageous embodiment of the present disclosure, the tie component has a conical shape, and the stop component has a conical shape that corresponds to the conical shape of the tie component.

According to another embodiment of the present disclosure, the coil can be, at least partially, encompassed by a U-shaped yoke, in particular wherein the yoke is made, a least in part, from a metal plate. An embodiment of the present disclosure of this type offers the advantage of a particularly low weight, and the use of inexpensive and smaller components.

It is particularly advantageous that a magnetic device can be designed, if a switch element is provided, such that it interacts with a positioning component disposed in a movement track and/or the tie component, in order to detect a position of the magnetic device in the movement track. A movement track can be understood to be a guide track provided for guiding a movement of the magnetic device. The movement track may be disposed outside the magnetic device thereby, and may have, for example, at least one projection, one position detection lug, one recess and/or one bushing (e.g. a metal bushing), in order to make defined positions in the magnetic device, in or on the movement track, detectable. An embodiment of the present disclosure of this type offers the advantage of the possibility of a precise detection of when a desired position of the magnetic device has been reached, such that an activation of the coil, or the activation current through the coil, respectively, can occur at a desired position, without error, and precisely. Furthermore, an embodiment of the present disclosure of this type offers the advantage that, by disposing the switch element on the magnetic device, work needed for wiring a sensor that detects the position of the magnetic device can be significantly reduced in that now, a line for transmitting a signal from the switch element can be combined, for example, with lines for transmitting an activation current for the coil. A separate line to a switch element that is positioned outside the magnetic device can thus be avoided, by means of which the production costs can be reduced. By way of example, an inexpensive lead frame may be used to implement the lines in the shift lever.

One embodiment of the present disclosure is particularly advantageous, in which the switch element includes a reed contact and at least one permanent magnet. An embodiment of the present disclosure of this type, in which, on one hand, a contact-less detection of a specific position in which the magnetic device is located, is possible, and on the other hand, as a result of the flexible selection of the magnetic strength of the permanent magnet, a definite and clear threshold value decision for determining this position can also be used. As a result, a particularly durable switch element can be produced.

An embodiment of the present disclosure in which a flux conducting component is disposed between one end of the reed contact and the permanent magnet, in each case, is particularly advantageous, in particular wherein at least one flux conducting component has a flux conducting lug facing toward the other flux conducting component. By arranging such flux conducting components in this manner, the flux conducting lug, in particular, offers such an embodiment of the present disclosure the advantage that a magnetic short circuit can be caused very easily by bringing another component into this region, such that a magnetic flux density at the reed contact decreases in this case, by means of which this reed contact becomes disengaged. As a result, a very precise detection of the component in the neighborhood of the flux conducting lug can occur in a technically very simple and thus inexpensive manner, which in turn can be used for a precise detection of the position of the magnetic device.

A gear shift lever having a magnetic device in accordance with an approach presented herein is particularly advantageous.

Furthermore, the approach presented herein results in a method for the production of a magnetic device, wherein the method includes the following steps:
provision of a coil, a tie component and a spring; and
arranging the tie component in the coil, wherein the tie component is movably supported in the coil, and wherein the spring is disposed outside the coil, wherein the spring is disposed such that it is able to push the tie component out of the coil.

Likewise, the approach presented herein also results in a method for operating a magnetic device having a coil, a tie component, which is or can be movably supported in the coil, and a spring, which is disposed outside the coil, wherein the spring is designed to push the tie component out of the coil, wherein the method includes the following step:

applying a coil current to the coil, in order to draw the tie component into the coil.

By means of methods of the type presented herein, it is also possible to implement the advantages of the approach that is the basis of this description in a simple and inexpensive manner.

The disclosure shall be explained in an exemplary manner based on the attached drawings. Therein.

In the following description of preferred exemplary embodiments of the present disclosure, the same or similar reference symbols shall be used for elements depicted in the various figures and functioning in a similar manner, wherein there shall be no repetition of the descriptions for these elements.

Figure 1:
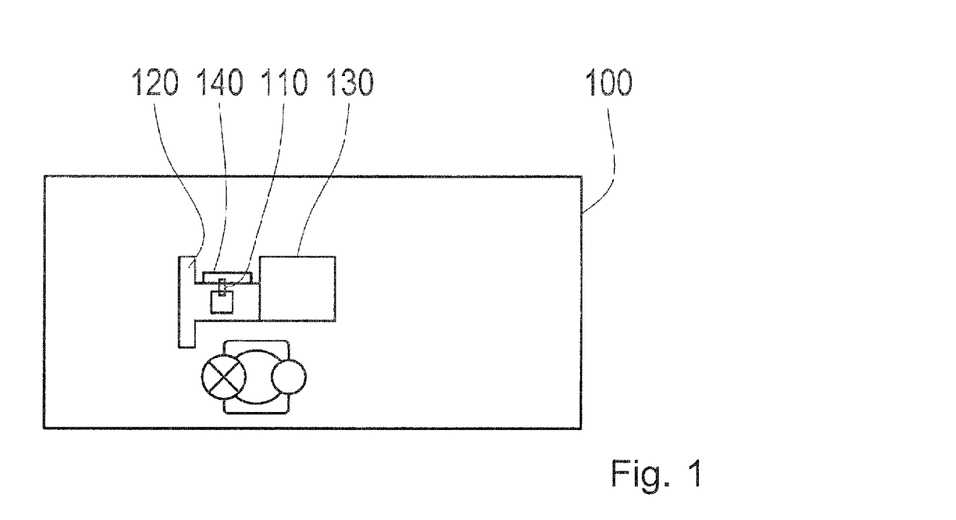
FIG. 1 shows a block diagram of a vehicle having an exemplary embodiment of the present disclosure in the form of a magnetic device.

FIG. 1 shows a block diagram of a vehicle 100 in which an exemplary embodiment of the present disclosure in the form of a magnetic device 110 is used. The magnetic device 110 is a component of a gear shift lever 120 of an automatic transmission 130 thereby, depicted disproportionately in FIG. 1. The magnetic device 110 is designed as a shift-lock magnet, for blocking or releasing a movement of the gear shift lever 120 when a current is applied thereto, in different selection positions (such as the parking position P or the neutral position N) for example (as has already been described above, for example, in reference to the four elementary functions of such magnetic systems.)

Figure 2:
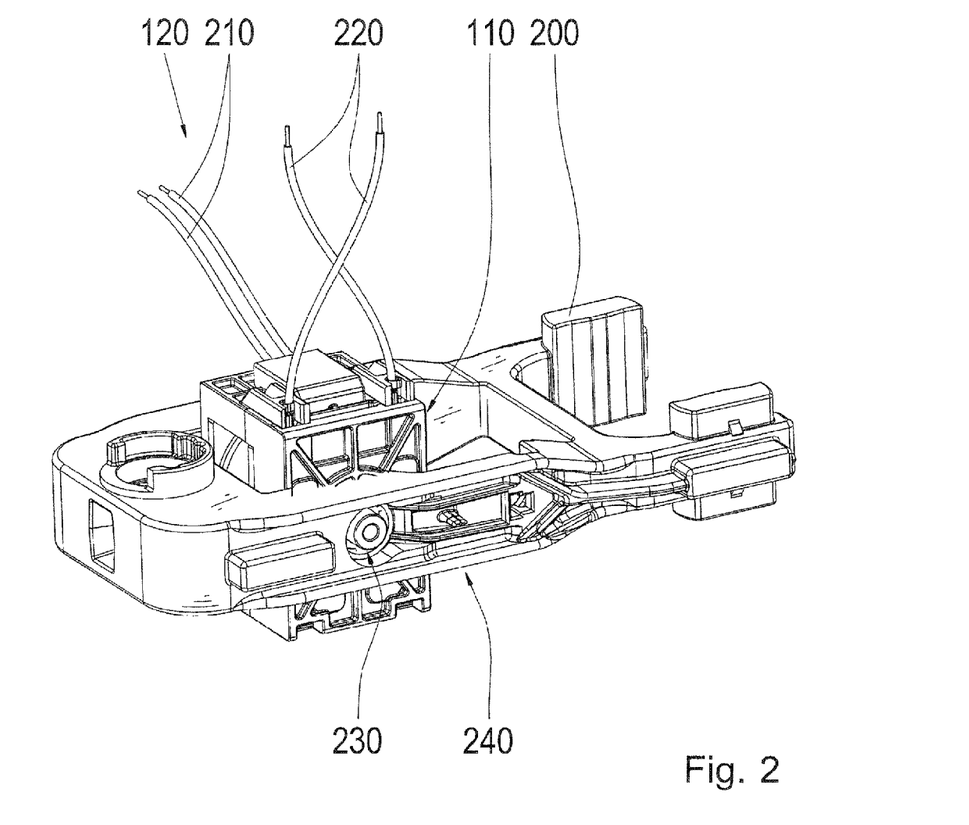
FIG. 2 shows a perspective view of an (inner) part of the gear shift lever.

FIG. 2 shows a perspective view of an (inner) part 200 of the gear shift lever 120, in which a magnetic device according to an exemplary embodiment of the present disclosure is installed. The magnetic device 110 is brought in contact with two activation current lines 210, which supply an activation current to a coil of the magnetic device 110, which coil shall be described and depicted in greater detail below. Furthermore, two signal lines 220 are provided, which convey a signal of a switch element of the magnetic device 110, which switch element shall be likewise described and depicted in greater detail below. If the gear shift lever 120 is then moved, the part 200 depicted in FIG. 2 is then moved, by way of example, upward or downward (in relation to the drawing plane of FIG. 2). An annular insert 230 can be moved thereby, for example, along a longitudinal slider 240, and be disposed in a specific position relative to the magnetic device 110 when the gear shift lever 120 is in a specific position. This position of the annular insert 230 can then be very precisely determined by means of the switch element that shall be described in greater detail below, by means of which the position, or the shifting setting, respectively, of the gear shift lever 120 can also be clearly detected.

Figure 3:
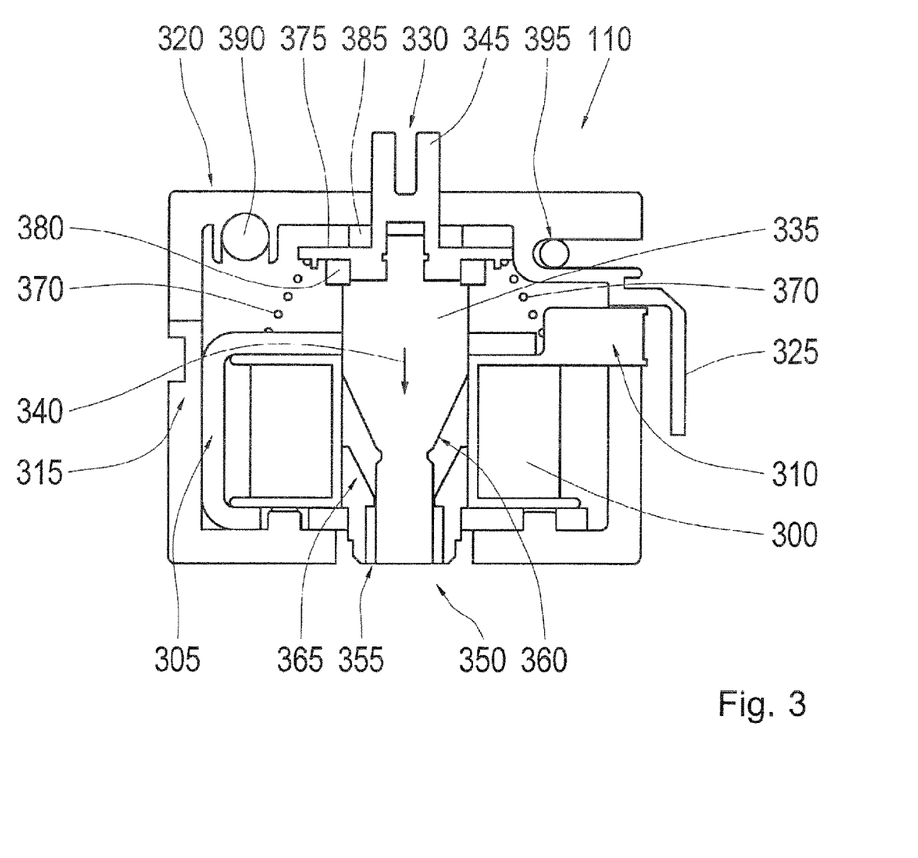
FIG. 3 shows a cross sectional view through an exemplary embodiment of the present disclosure in the form of a magnetic device.

FIG. 3 shows a cross sectional depiction through an exemplary embodiment of the present disclosure in the form of a magnetic device 110. The magnetic device 110 comprises a coil 300, which comprises, for example, a winding made of copper wire. The coil 300 is encompassed by a U-shaped yoke 305, which is made from a metal plate, for example. Furthermore, a plug-in connection 310 is provide, in order to connect the activation current lines 210 from FIG. 2 (which are not shown in FIG. 3), such that an activation current can be conducted through the coil 300. The coil 300, the yoke 305, and the plug-in connection 310 are contained in a lower housing element 315, onto which an upper housing element 320 is placed during the production of the magnetic device 110, in order to form a complete housing for the magnetic device 110. The upper housing element 320 comprises a lateral safety bar 325, which extends over the plug-in connection 310, and thus covers an activation current line 210 of the plug, not shown in FIG. 3, on one hand, and secures it in place on the other hand.

Furthermore, the magnetic device 110 has a tie component 330, which is or can be movably supported by the coil 300. The tie component 330 has numerous subcomponents thereby, including, by way of example, a metallic, magnetic and/or magnetizable core 335, which is drawn into the coil in a pulling direction 340 by a magnetic force when an activation current flows through the coil 300. The core 335 is permanently connected thereby to another subcomponent, in this case a tappet 345, which is made, for example, from a different material than that of the core 335 (for practical purposes, a material with a low density), or contains such a material. In this manner, very light tie components 330 can be provided, in terms of their weight, which are moved into the coil 300 in a pulling direction 340 when an activation current flows through the coil 300.

The tie component 330 is supported in a slide bushing 355 in a penetration 350 in the lower housing element 315, in order to ensure a light and unobstructed sliding of the tie component 330 through the coil 300. In order to then ensure a clear and reproducible position of the tie component 330 when the magnetic device 110 is activated by an introduction of the activation current through the coil 300, the core 332 then has a section 360 with a conical shape, in which the core 335 tapers toward the slide bushing 355. Furthermore, the magnetic device 110 has an end stop 365, which likewise has a conical shape corresponding to the shape of the section 360. As a result, a very large support surface is realized when the section 360 is placed on the end stop 365, such that a secure and precise positioning of the tie component 330 can be achieved when the magnetic device 110 is activated.

In order to then bring the tie component 330 back into the starting position depicted in FIG. 3 after the magnetic device 110 has been activated, a spring is provided, which is designed as a conical or circular spring in the present case. The spring 370 is incorporated between the yoke 305 and a projection 375 on the tappet 345, such that it is tensioned when the tie component 330 is moved in the pulling direction 340. Because of the provision of the spring 370, there is thus no need for a return of the magnetic device 110 by means of an activation current flowing through the coil 300 with the opposite charge (with respect to the current flow for moving the tie component 330 in the pulling direction 340), such that a strong overheating of the magnetic device 110 during operation can be reduced or even prevented.

In order to ensure the longest possible lifetime of the magnetic device 110, impacts of a movement of the tie component 330 in the pulling direction 340, in particular when placing the projection 375 on the yoke 305 can be cushioned in that a damping component 380 is provided, which is attached to the projection 375, and is disposed between the projection 375 and the yoke 305. In order to prevent a hard impact of the magnetic device 110 when placing it on the upper housing element 320 during a return thereof, a pad 385 may also be provided, which is disposed at and attached to a side of the projection 375 lying opposite the spring 370. The damping component 380 and/or the pad 385 can be produced, for example, from a resiliently deformable silicone material or foam material. The damping component 380 and the pad 385 can advantageously be designed thereby, such that, for example, an inner diameter of the damping component 380 corresponds to an outer diameter of the pad 385. In this manner, waste material from the stamping for the production of the damping component 380 can be reused for producing the pad 385, by means of which material costs can be reduced. Alternatively, an inner diameter of the pad 385 can also, as a matter of course, correspond to an outer diameter of the damping component 380.

In order that a position of a magnetic device 110 can be more easily and reliably determined, the magnetic device further comprises a permanent magnet 390, which is embedded in a corresponding recess of the upper housing element 320. This permanent magnet 390 is connected to the flux conducting elements, not shown in FIG. 3, with a reed contact 395, which is slid into a lateral recess of the upper housing element 320, and which can be brought into or is in contact through the two signal lines 220 from FIG. 2, as shall be explained in greater detail below.

Figure 4:
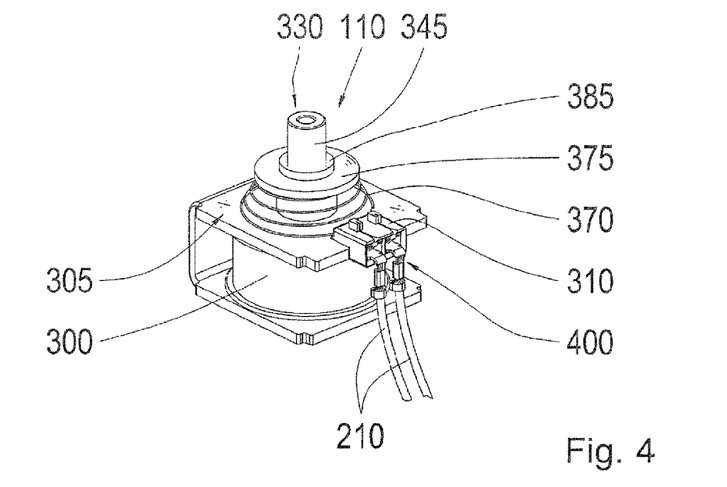
FIG. 4 shows a perspective view of numerous components of the magnetic device according to an exemplary embodiment of the present disclosure.

FIG. 4 shows a perspective view of numerous components of the magnetic device 110 according to one exemplary embodiment of the present disclosure. It is visible therein that the spring is designed as a conical or circular spring, which exerts a uniform pressure on the projection 375 of the tappet 345. Furthermore, the pad 385 can be seen, which is disposed on the upper surface of the projection 375, which surface is visible in FIG. 4. Likewise visible is the yoke 305, on which plug-in contacts 400, as well as activation current lines 210 attached thereto, are depicted. As a result of the arrangement of spring 370, a very compact construction of the coil 300 with the tie components 330 movably supported thereon can be produced, because now, in the interior of the coil, meaning in the movement range of the tie component 330, an opening with a smaller diameter is required, and thus, less material is needed to form the coil 300. This is particularly economical when the raw material prices are high, as is currently the case with copper.

Figure 5:
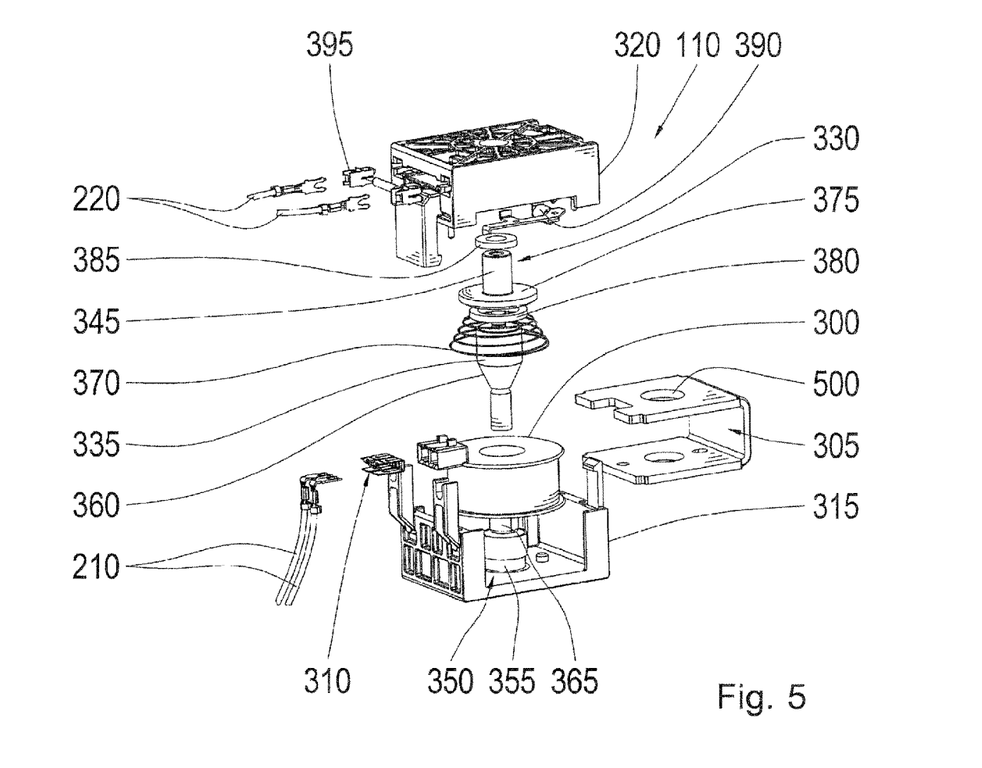
FIG. 5 shows a depiction of an exemplary embodiment of the magnetic device in an exploded view.

FIG. 5 shows an exemplary embodiment of the magnetic device 110 in an exploded view. The construction of the magnetic device 110 with the coil 300 having the yoke 305 placed on it, which yoke has a hole 500 that exposes the interior of the coil 300, can be readily seen therein. Furthermore, the tapering section 360 of the core 335 of the tie component 330, the spring 370, the damping component 380, the tappet 345 (which extends out of the magnetic device 110 when no current is applied, and enables a securing of the magnetic device 110, or the gear shift lever 120 affixed to the magnetic device, respectively, in a predetermined position on a movement track 140 that is not depicted in FIG. 5), the pad 385, the permanent magnet 390, as well as the reed contact 395, can be readily seen therein.

Figure 6:
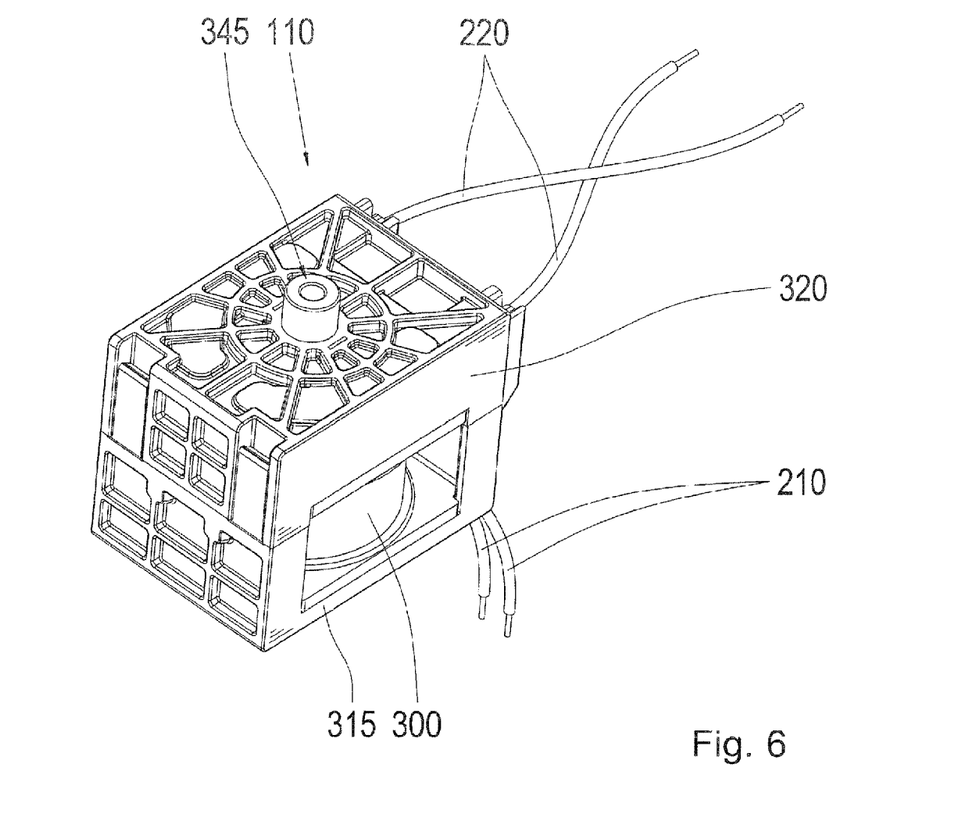
FIG. 6 shows a depiction of an exemplary embodiment of the present disclosure in the form of a magnetic device, in a perspective view.

FIG. 6 shows an exemplary embodiment of the present disclosure in the form of a magnetic device 110 in a perspective view. The tappet 345 can be seen therein in an extended state, meaning that it is in a state in which no activation current has been applied to the coil 300 through the activation lines 210. As can be seen in the depiction reproduced in FIG. 6, the tappet 345 extends over the upper housing element 320 and can thus engage in a recess in a movement track 140, which recess is not shown in FIG. 6, and fix the magnetic device 110 in a specific position.

Figure 7:
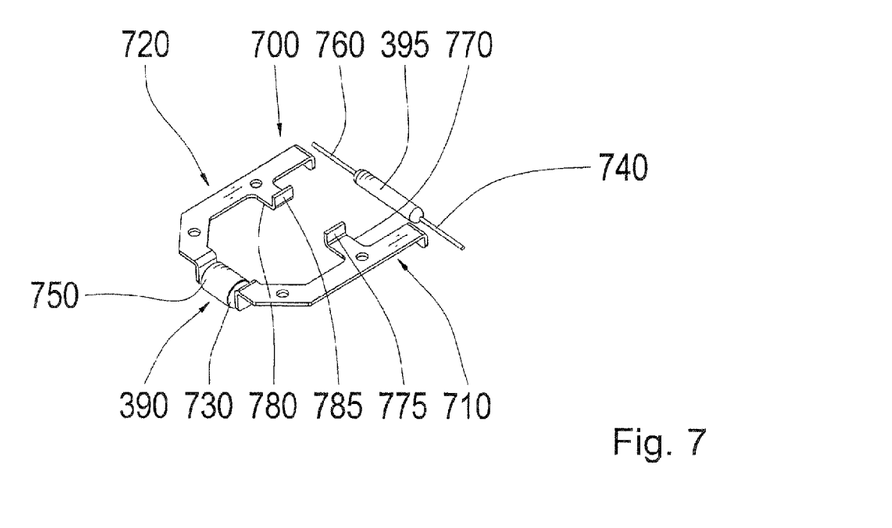
FIG. 7 shows a perspective depiction of a switch element, as it might be installed, for example, in an upper housing element in accordance with FIG. 3, for use in an exemplary embodiment of the present disclosure.

FIG. 7 shows a perspective depiction of a switch element 700, as it can, for example, be installed in an upper housing element 320 in accordance with FIG. 3. The switch element 700 comprises the permanent magnet 390 as well as the reed contact 395, and a first flux conducting element 710 and a second flux conducting element 720 thereby. The first flux conducting element 710 is disposed between a first pole 730 of the permanent magnet 390 and a first connection 740 of the reed contact 395. The second flux conducting element 720, which, like the first flux conducting element 710, is designed as a flux conducting plate, is disposed between a second pole 750 of the permanent magnet 390 and a second connection of the reed contact 395. In this manner, a magnetic flux is conducted by the permanent magnet 390 through the first flux conducting element 710, via the reed contact 395, and through the second flux conducting element 720 back to the permanent magnet 390.

Furthermore, the first flux conducting element 710 has a first flux conducting lug 770, which extends from the first flux conducting element 710 toward the second flux conducting element 720, and has a bent section 775, which bends away from a main extension plane of the first flux conducting element 710 (upward in FIG. 7). The second flux conducting element 720 also has a second flux conducting lug 780, which extends from the second flux conducting element 720 toward the first flux conducting element 710, and has a bent section 785, which is bent away from a main extension plane of the second flux conducting element 720 (upward in FIG. 7).

Figure 8A:
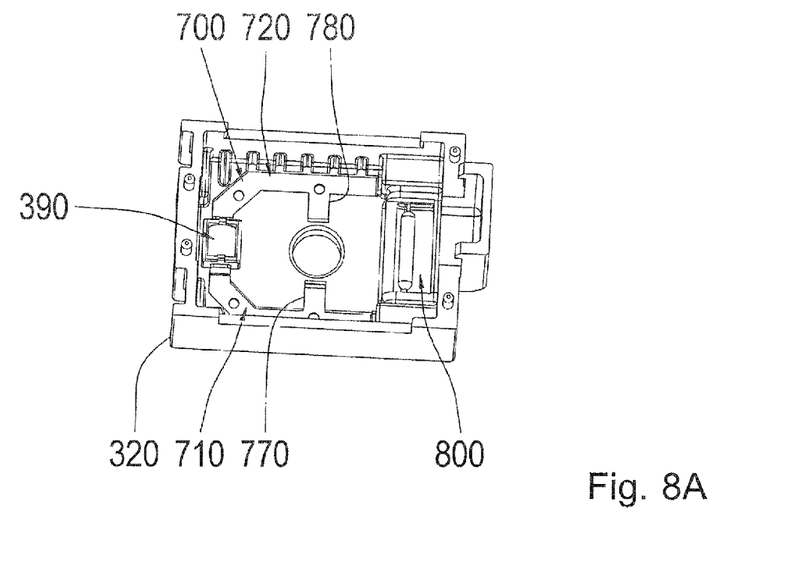
FIG. 8A shows a depiction of an upper housing element having a switch element disposed therein for use in an exemplary embodiment of the present disclosure.

FIG. 8A shows a depiction of an upper housing element 320 having a switch element 700 disposed therein, as has been explained in greater detail in reference to FIG. 7. The reed contact 395 depicted in FIG. 7 is covered in FIG. 8 by a projection 800 of the upper housing element 320.

Figure 8B:
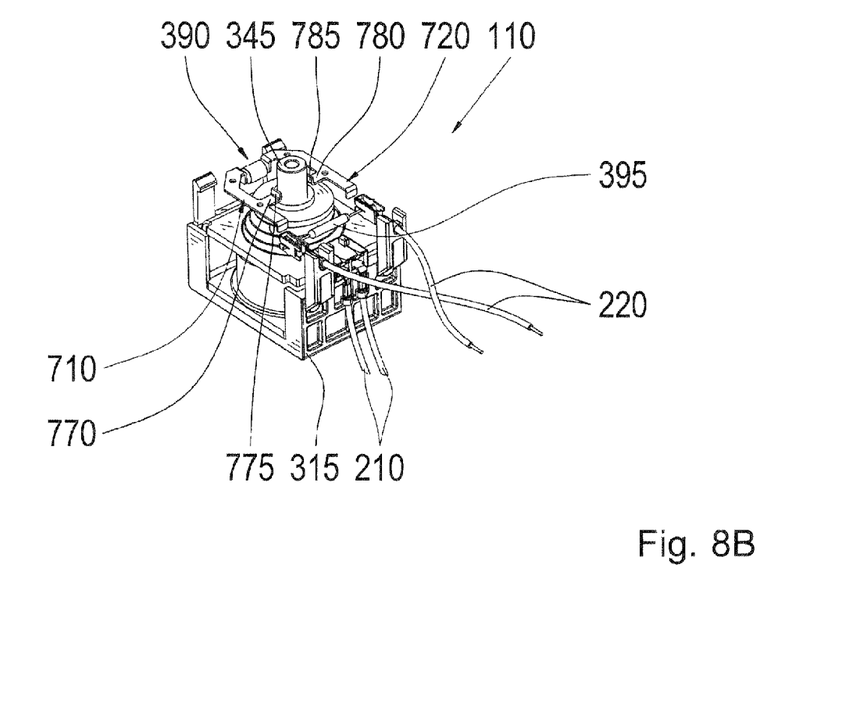
FIG. 8B shows a perspective view of a magnetic device according to an exemplary embodiment of the present disclosure having a removed upper housing element, but with the switch element provided for in this housing element.

FIG. 8B shows a perspective depiction of a magnetic device 110 with the upper housing element 320 removed, having, however, a switch element 700 provided in this housing element 320. It is clear thereby that the tappet 345, in a state in which it extends out of the housing of the magnetic device 110, is disposed between the two bent sections 775 and 785 of the first flux conducting lug 770 and the second flux conducting lug 780, respectively. In particular then, when either the tappet 345 itself comprises a metallic, magnetic, and/or magnetizable material, or is encompassed by a sleeve made of such a material, the magnetic flux caused by the permanent magnet 390 can then flow in a short circuit between the first flux conducting lug 770 and the second flux conducting lug 780, by means of which it no longer lies in the magnetic (main) flow when the reed 395 is engaged, and thus disengages it. In this manner, it can be very easily determined, without touching it, whether the tappet 345 and a metallic, magnetic and/or magnetizable element are disposed between the first flux conducting lug 770 and the second flux conducting lug 780, or has been inserted into this region.

Alternatively, the (not metallic, magnetic or magnetizable) tappet 345 can force a metallic, magnetic or magnetizable element, such as an annular insert 230, corresponding to the depiction from FIG. 2, away from a region between the first flux conducting lug 770 and the second flux conducting lug 780. In this case, a magnetic flux is thus formed via the reed contact 395 in a state in which the tappet 345 extends out of a housing of the magnetic device 110, while in a state in which the tappet 345 does not extend out of a housing of the magnetic device 110, a magnetic flux flows through the metallic, magnetic, or magnetizable element inserted between the first flux conducting lug 770 and the second flux conducting lug 780, and disengages the reed contact 395. The evaluation of the switching state of the reed contact 345 by means of signal lines 220 can thus be carried out taking into consideration the arrangement of metallic, magnetic, or magnetizable components in the region between the first flux conducting lug 770 and the second flux conducting lug 780 to deliver an indication of whether the tappet 345 extends or does not extend out of a housing of the magnetic device 110.

Figure 9A:
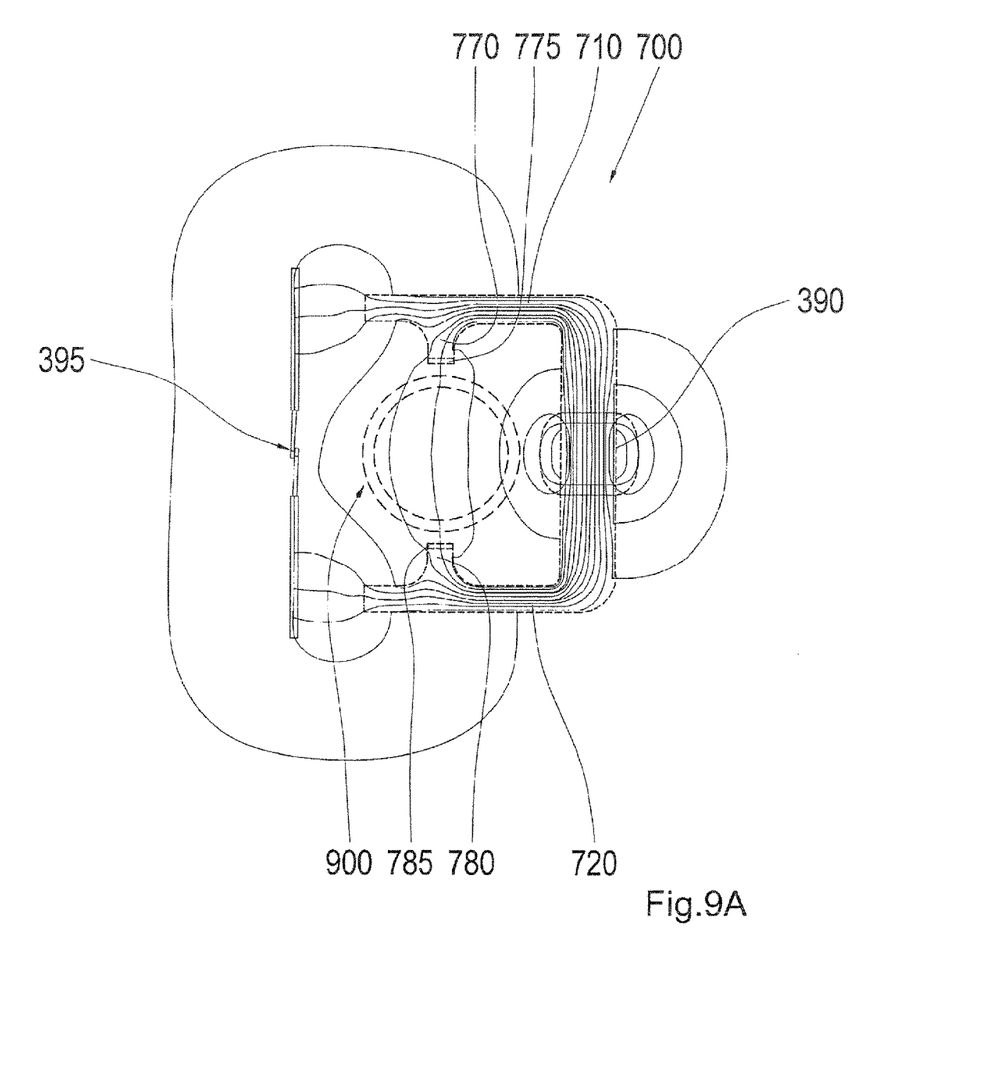
FIG. 9A shows a top view of the switch element for use in an exemplary embodiment of the present disclosure, wherein magnetic flux lines through the corresponding components of the switch element are depicted.

FIG. 9A shows a top view of the switch element 700, wherein magnetic flux lines through the corresponding components of the switch element 700 are now depicted. In this case, no element, e.g. the annular insert 230, the tappet 345, or a corresponding metallic sleeve encompassing the tappet 345, is disposed at the position 900 between the first flux conducting lug 770 and the second conducting lug 780 depicted by a broken line. It is thus visible in FIG. 9A that the magnetic flux generated by the permanent magnet 390 flows nearly entirely through the reed contact 395, by means of which the reed contact becomes engaged.

Figure 9B:
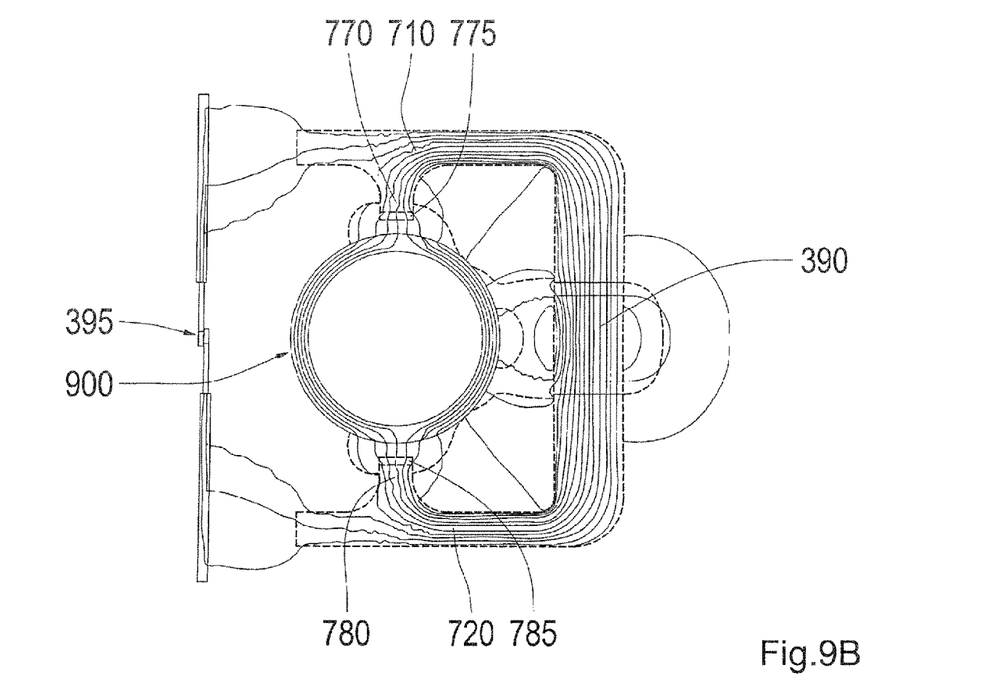
FIG. 9B shows a top view of the switch element for use in an exemplary embodiment of the present disclosure.

FIG. 9B shows a top view of the switch element 700, wherein, a corresponding metallic, magnetic, and/or magnetizable element, e.g. the annular insert 230, the tappet 345, or a corresponding metallic sleeve encompassing the tappet 345, is then disposed in the position 900 between the first flux conducting lug 770 and the second flux conducting lug 780. As can be seen in FIG. 9B, a magnetic short circuit is induced between the first flux conducting lug 770 and the second flux conducting lug 780 by the element at the position 900, such that the main portion of the magnetic flux generated by the permanent magnet 390 flows through the element at the position 900. As a result, a very small portion of the magnetic flux flows through the reed contact 345, resulting in it disengaging. The disengagement or engagement of the reed contact 345 can be detected through connections of the signal lines 220 and as a result, (without touching it, for example) the positioning of the (metallic, magnetic and/or magnetizable) element in the position 900 can be detected.

Figure 10:
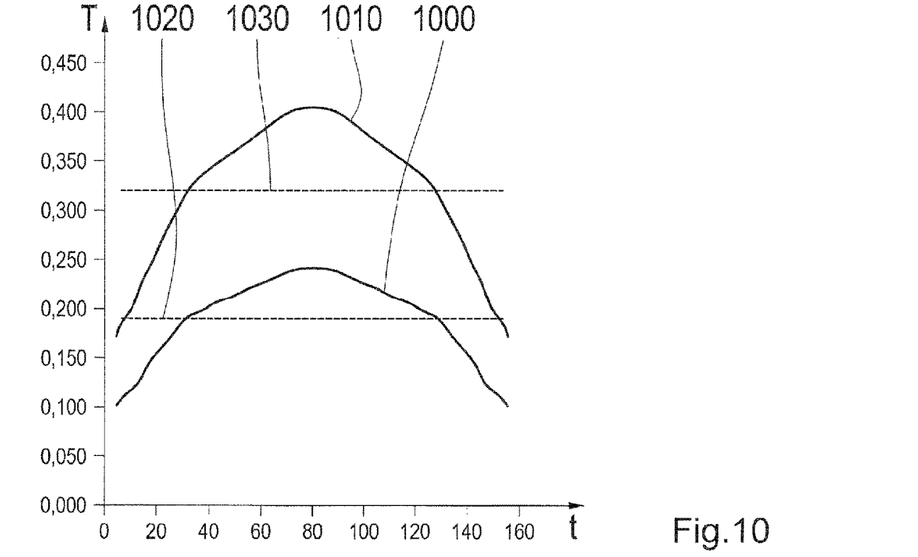
FIG. 10 shows a diagram for illustrating the detection of an element in a position between two flux conducting components.

FIG. 10 shows a diagram in which a magnetic flux is illustrated, flowing (depicted at different measuring points) in Teslas T between the connections for the reed contact 345 over a time period t. A corresponding element is retracted from and inserted into the position 900 between the first flux conducting lug 770 and the second flux conducting lug 780 thereby. If this element, a metallic, magnetic and/or magnetizable element, e.g. an annular insert 230, corresponding to the depiction in FIG. 2, is then in a shifting setting of the gear shift lever 120 in the shifting position for park P, then the characterizing line of the magnetic flux will rise at a substantially lower incline, due to the magnetic short circuit caused at the reed contact 345 between the first flux conducting lug 770 and the second flux conducting lug 780, than it would in other cases, in which no metallic, magnetic and/or magnetizable element is inserted at the position 900, such that, in these cases, there is then a magnetic flux corresponding to the characterizing line 1010 flowing through the reed contact 995. By this means, it is possible to determine that a metallic, magnetic and/or magnetizable element has then been introduced in the position 900 when a magnetic flux T is detected at the reed contact 395, which exceeds a first threshold value 1020, but not a second threshold value 1030, which is greater than the first threshold value 1020. If it is then detected that there is a metallic, magnetic, and/or magnetizable element at position 900, this information can be interpreted as a locking in place of the gear shift lever 120, and the ignition key may be released, such that it can be removed from the ignition.

In summary, it can thus be stated that the approach described herein to the problem described above is solved, at least in part, by a fundamentally novel construction, in which the individual functions of the magnets, or the magnetic device, are resolved, and depicted in a new arrangement. Thus, the sub-function "longitudinal actuator" is formed by an E-magnet, which functions exclusively as a magnet, and thus can be cleanly configured. By means of this measure, the copper portion of the coil 300 of the magnet 110 can be significantly reduced. The now possible design for the end stop 365 enables a "Peek and Hold" control, thus lowering power consumption. This compact arrangement enables the use of a simple U-yoke 304, which likewise reduces the system costs. The tie 335 (or core) may be smaller, thus reducing the moving mass and thus the kinetic energy of the actuated tie 335. The introduction of the tappet 345, as an extension of the tie 335, made of plastic likewise reduces the tie mass in relation to a tie 335 made of a single piece. The end position cushioning with the silicone foam disks 380 or 385 can be configured via the geometry of the tappet 345. The sub-function of the end position cushioning is disposed in the actuation axis behind the magnet 300 or 335, and is depicted by means of silicone foam disks 380 or 385, wherein here, the stamping remains from the larger disk 380 represents the base material for the smaller disk 385. The return of the tie 335 is carried out with the conical spring 370. The housing halves 315 and 320 support the force applied by the tie 335 and the tappet 345 into the encompassing housing of the shift lever 120. The use of a plastic part as a lower housing element 315 or upper housing element 320 provides a great deal of freedom in the design thereof, and enables an integration of the switching function in the position "P." The switching function is depicted via a reed switch 395, which is constantly attracted via a permanent magnet 390 and a flux conducting plate 710 or 720. When the annular insert 230 of the longitudinal slider 240 is located in front of the magnet 110, the field is conducted to the position 900 via the bent sections 775 or 785, and the insert, and the reed contact 395 is disengaged.

As an alternative to the reed switch 395, a micro-switch or retaining element, not shown in the figures, can also be used, which detects a switching cam on the longitudinal slider 240. As an alternative to the cables 210 and/or 220, a lead frame can be used for the internal wiring in the shift lever 120. Instead of the contacts used for establishing contact with the coil 300 and the reed 395, a resistance welded connection (or solder connection) can also be implemented.

Through the approach presented herein, it is possible to prevent that a higher power consumption and thus an excess heating in the shift lever is caused. As a result, a high temperature component specification can be avoided. High position tolerances can also be prevented, due to which a magnetic device would be difficult to configure. A separately installed switch for the detection of the position "P" can also be avoided. Furthermore, in new projects for developing a magnetic device 110, a great deal of work regarding the application thereof is also to be avoided. A complex wiring architecture in the shift lever 120 can also be avoided, and there is no need for a large/expensive coil with a high copper content. Moreover, a complex and expensive magnet yoke can be eliminated, and a "Peek and Hold" control can be enabled with the approach proposed herein.

Moreover, with the approach presented herein, many of the problems described above are resolved. On one hand, and end position cushioning can be removed from the magnet and disposed in the extension of the tie axis. This results in more advantages. By way of example, the tie diameter can be reduced. Furthermore, it is also possible to reduce the tie mass and kinetic energy needed for a movement of the tie. The magnetic circuit can be finely tuned with regard to the stroke behavior, and the end position tolerances become reduced. It is possible to aim for a greater holding force, which enables a "Peak and Hold" control. The power consumption and heating also are reduced. The coil can be reduced in size, the copper content is reduced, resulting in a clear reduction in costs. Furthermore, the end position cushioning can also be very well aligned, and a thinner and less expensive material can be used. By using a two part tie having a plastic portion, the mass of the tie is likewise reduced. The use of a plastic frame for the mount for the switch element (e.g. in the upper housing element 320) enables the integration of a reed switch for detecting the shifting setting of the gear shift lever 120 in the position "P." The insert 230 already present in the longitudinal slider can be detected with the magnet 390 integrated in the frame 320. The cutting-clamping contacts enable a solderless attachment of the reed contact 395. The interface to the shift lever can be designed with a great deal of freedom, due to the use of a plastic part and be easily configured to the respective application via interchangeable inserts in a tool. If the magnet 110 is also used as a dynamic vibration absorber for cushioning structure-born sound waves in the shift lever 120, the support of the shift lever 120 in the housing via the plastic frame can be finely configured. By integrating the switch function in the magnet 110, the internal wiring between the printed circuit board and the functionality "magnet and switch" are joined at a location that reduces the wiring work. If applicable, the internal wiring (e.g. the lines 210 and 220) can be formed by a lead frame. This is enabled, in particular, in that the contact direction for both functions is in the same direction.

Figure 11:
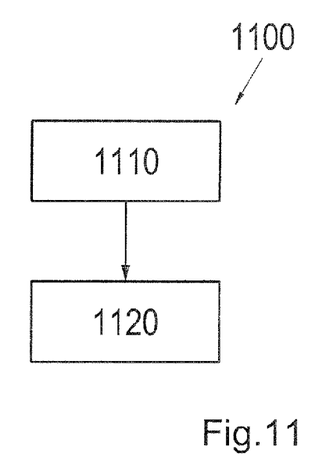
FIG. 11 shows a flow chart of an exemplary embodiment of the present disclosure in the form of a method.

FIG. 11 shows a flow chart of an exemplary embodiment of the present disclosure in the form of a method 1100 for producing a magnetic device. The method 1100 comprises a step 1110 for the provision of a coil, a tie component and a spring, and a step 1120 for the arrangement of the tie component in the coil, wherein the tie component is movably supported in the coil, and wherein the spring is disposed outside the coil, wherein it is disposed such that it can push the tie component out of the coil.

Figure 12:
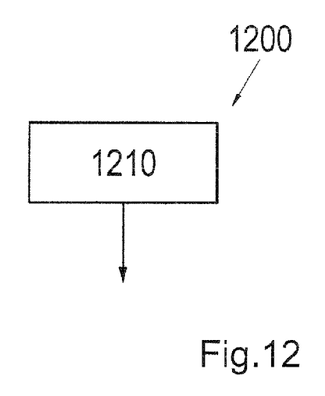
FIG. 12 shows a flow chart of another exemplary embodiment of the present disclosure in the form of a method.

FIG. 12 shows a flow chart of an exemplary embodiment of the present disclosure in the form of a method 1200 for operating a magnetic device having a coil, a tie component, which is or can be movably supported in the coil, and a spring, which is disposed outside the coil, wherein the spring is designed to push the tie component out of the coil. The method 1200 comprises the step 1210 in which a coil current is applied to the coil, in order to draw the tie component into the coil.

The exemplary embodiments that are described and shown in the figures are selected only by way of example. Different exemplary embodiments can be combined with one another, in their entirety, or with respect to individual features. An exemplary embodiment can also be supplemented by features of another exemplary embodiment.

Furthermore, method steps can be repeated in accordance with the disclosure, as well as being executed in another sequence than that in the description.

If an exemplary embodiment comprises an "and/or" conjunction between a first feature and a second feature, this may be read to mean that the exemplary embodiment exhibits both the first feature as well as the second feature according to one exemplary embodiment, and, according to another exemplary embodiment, exhibits either only the first feature or only the second feature.

REFERENCE SYMBOLS 100 vehicle
110 magnetic device
120 gear shift lever
130 automatic transmission
140 movement track
200 (inner) portion of the gear shift lever
210 activation current lines
220 signal lines
230 annular insert
240 longitudinal slider
300 coil
305 yoke
310 plug-in connection
315 lower housing element
320 upper housing element
325 safety bar
330 tie component
335 metallic core
340 pulling direction
345 tappet
350 penetration
355 slide bushing
360 section having a conical shape
365 end stop
370 spring 375 projection
380 damping component
385 pad
390 permanent magnet
395 reed contact
400 plug-in contact
500 hole
700 switch element
710 first flux conducting element
720 second flux conducting element
730 first pole
740 first connection
750 second pole
760 second connection
770 first flux conducting lug
775 bent section of the first flux conducting lug
780 second flux conducting lug
785 bent section of the second flux conducting lug
800 projection of the upper housing element 320
900 position between the first and second flux conducting lugs
1000 characterizing line
1010 characterizing line
1020 first threshold value
1030 second threshold value
1100 method for producing a magnetic device
1110 step for providing
1120 step for arranging
1200 method for operating a magnetic device
1210 step of applying current

The invention claimed is:

1. A magnetic device for locking a gear shift lever of a vehicle in a predetermined position, the magnetic device comprising:
   a coil;
   a tie component, which is movably supported in the coil;
   a spring disposed outside the coil, wherein the spring is designed to push at least a portion of the tie component out of the coil;
   a switch element which is designed to interact with a positioning element and the tie component disposed on a movement track in order to detect a position of the magnetic device in the movement track.

2. The magnetic device according to claim 1, wherein the spring is a conical spring, wherein the spring encompasses at least part of the tie component.

3. The magnetic device according to claim 1, wherein the tie component has a core, wherein at least a part of the core can move in the coil, and a tappet attached to the core, wherein the tappet comprises a different material than the core.

4. The magnetic device according to claim 3, wherein a magnetic force draws the core toward the coil when an activation current flows through the coil.

5. The magnetic device according to claim 1, further comprising a pad, wherein the pad is disposed on a side of the spring lying opposite the coil.

6. The magnetic device according to claim 5, wherein the damping component has an opening with an inner diameter that corresponds to an outer diameter of the pad, or wherein the pad has an opening with an inner diameter that corresponds to an outer diameter of the damping component.

7. The magnetic device according to claim 1, further comprising a stop component, which is disposed on a side of the coil lying opposite the spring, wherein the stop component is designed to limit a movement pathway of the tie component in the coil.

8. The magnetic device according to claim 7, wherein the tie component has a conical shape, and the stop component has a conical shape corresponding to the conical shape of the tie component.

9. The magnetic device according to claim 1, wherein the coil is at least partially encompassed by a U-shaped yoke wherein the yoke is at least partially made from a metal plate.

10. The magnetic device according to claim 1, wherein an end of the spring facing away from the coil is supported on a projection of the tie component, wherein a damping component is disposed between the projection and the coil.

11. The magnetic device according to claim 1, wherein the switch element is a reed contact and has at least one permanent magnet.

12. The magnetic device according to claim 11, further comprising a plurality of flux conducting elements, each disposed between an end of the reed contact and the permanent magnet, wherein at least one flux conducting element has a flux conducting lug facing toward the other flux conducting element.

13. The magnetic device according to claim 12, further comprising a first flux conducting lug and a second flux conducting lug, wherein a magnetic short circuit is induced between the first flux conducting lug and the second flux conducting lug when a portion of the tie component is located between the first flux conducting lug and the second flux conducting lug, such that a majority of the magnetic flux generated by the permanent magnet flows through the portion of the tie component located between the first flux conducting lug and the second flux conducting lug.

14. A gear shift lever having a magnetic device according to claim 1.

15. The magnetic device according to claim 1, wherein the tappet is comprised of a plastic material.

16. The magnetic device according to claim 1, wherein the spring is a circular spring, wherein the spring encompasses at least part of the tie component.

17. A method for producing a magnetic device, the method comprising the following steps:
   providing a coil, a tie component a spring, a switch element, and a positioning element; and
   arranging the tie component in the coil, wherein the tie component is movably supported in the coil and wherein the spring is disposed outside the coil, wherein the spring is disposed such that it pushes the tie component out of the coil, wherein the switch element is designed to interact with the positioning element and the tie component disposed on a movement track in order to detect a position of the magnetic device in the movement track.

18. A method for operating a magnetic device having a coil, a tie component which is movably supported in the coil, and a spring which is disposed outside the coil, wherein the spring is designed to push the tie component out of the coil, and a switch element which is designed to interact with a positioning element and the tie component disposed on a movement track in order to detect a position of the magnetic device in the movement track, the method comprising the following step:
   application of an activation current to the coil in order to draw the tie component into the coil.

19. A magnetic device for locking a gear shift lever of a vehicle in a predetermined position, the magnetic device comprising:
   a coil;
   a tie component, which is movably supported in the coil;

a spring disposed outside the coil, wherein the spring is designed to push at least a portion of the tie component out of the coil; and a switch element which is designed to interact with a positioning element or the tie component disposed on a movement track in order to detect a position of the magnetic device in the movement track.

* * * * *